UNITED STATES PATENT OFFICE.

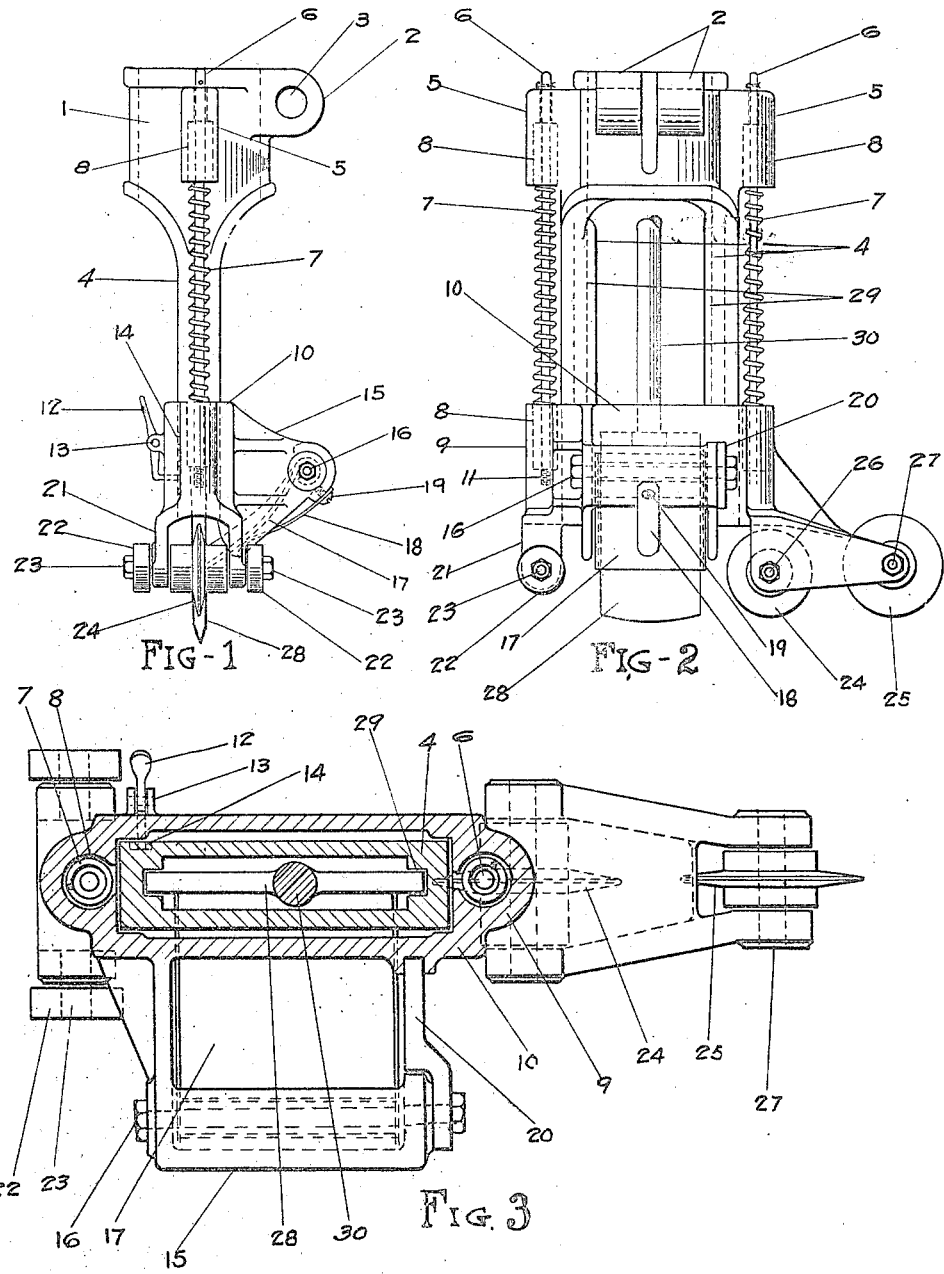

NELSON GAY, OF PORTLAND, OREGON.

CALKING-MACHINE.

1,247,815.    Specification of Letters Patent.    Patented Nov. 27, 1917.

Application filed September 7, 1917. Serial No. 190,239.

*To all whom it may concern:*

Be it known that I, NELSON GAY, a citizen of the United States, residing at Portland, county of Multnomah, State of Oregon, have invented certain new and useful Improvements in Calking-Machines, of which the following is a specification.

This invention relates to improvements in a pneumatically or mechanically operated calking tool, and has mainly for its object the provision of a machine of this character which may be more speedily and economically operated in filling and sealing all seams.

More particularly, I aim to improve first, the general construction and arrangement of the operating mechanism; second, the manner of mounting the same so that the assembled calking machine complete with driving power, will form a compact, light, simple and inexpensive tool, and third, in certain details relating to the application of mechanical driving power, the lip for tucking the material, the adjustment for determining and setting the depths of penetration of the knife into the seam, and the location of guide rollers to keep the machine in operating position over the seam at all times.

The invention is illustrated in the accompanying drawings, in which:—

Figure 1 is an end view of the calking machine embodying my improvements, Fig. 2 is a side elevation of the same, looking toward the side on which is located the guide through which the material is fed. Fig. 3 is a section on a horizontal plane just below the upper face of the carriage 10.

1 is a sleeve which may be clamped to the power actuating device, presumably a pneumatic riveting gun by a bolt passing through the bolt hole 3 in the lugs 2. Projecting below and attached to the sleeve 1 are guide arms 4. On opposite sides of the sleeve 1 are lugs 5 through which slides a spring guide rod 6 which carries the penetration adjustment spring 7, said springs terminating in sockets 8 in lugs 5 on sleeve 1 and lugs 9 on carriage 10. Guide rods 6 are permanently fastened to carriage 10 at 11. On the carriage 10 is a pawl and ratchet mechanism 12 operating about a pin 13 and engages slots 14 in guide arms 4. This regulates the depth of penetration of the knife 28.

On the opposite side of the carriage 10 is a material guide 15 cast integral with above carriage. Within the material guide 15 and operating about a pin 16 and against the knife 28 is a tucking lip 17. Attached to the underside of 15 is a spring 18, which is held in position by a screw 19 causing a continuous pressure on tucking lip 17. Referring to Fig. 2, the right hand side of guide 15 is open to facilitate easy threading of the material. In order to close this during actual operation of the machine, a hinged end 20 is fitted which operates about the pin 16.

On the under side of carriage 10 are lugs 21, which carry supporting rollers 22 operating on pins 23, these are following rollers and are located at the rear of the carriage 10.

Attached to the forward and underside of carriage 10 are guide rollers 24 and 25, operated on pins 26 and 27, these rollers operating in line of knife 28 and in the seam to be worked.

The knife 28 operates in slots 29 in guide arms 4 and against tucking lip 17. Attached to the upper edge of the knife is a connecting rod 30, which is directly connected to the driving mechanism.

In operation, a piece of the material to be calked is threaded in the machine, which is placed in position over the seam. When the power is applied the knife is forced down driving the material into the seam and drawing enough material through the guide to form a tuck for the next blow, any penetration of the knife into the seam may be had by a downward pressure on the handle, the pawl holding it in this position until released by the operator.

Having thus described my invention what is claimed as new is:—

1. A mechanical calking tool the combination of a knife coöperating with a tucking lip, a spring reacting on tucking lip, a material guide with an adjustable end for threading material, a carriage supporting the said guide and tucking lip, having on its lower extremities supporting and guide wheels, said carriage being slotted inside and movable along guide arms under pressure of the penetration adjustment springs.

2. A mechanical calking tool, the combination of a knife coöperating with a tucking lip, a spring reacting on tucking lip, the whole mounted on a carriage movable along a guide member, a pawl and ratchet mechanism, to securely retain carriage in any position along guide members to obtain any desired depth of penetration of said knife into seam.

3. A mechanical calking tool, the combination of a knife coöperating with a tucking lip, a spring reacting on the said tucking lip and material guide in combination with the carriage, and adjustable opening to fill material guide, supporting rollers located directly under carriage and in line with knife, a pawl and ratchet mechanism to retain carriage in any position along guide arms, a series of springs to return carriage to normal position when pawl is released.

4. A calking tool comprising a clamp adapted to be secured to a pneumatic hammer, guide arms depending from said clamp, a knife reciprocably mounted in said guide arms, a connecting rod for connecting said knife with the pneumatic hammer, a carriage adjustable on the guide arms, spring guide rods connecting the carriage with the clamp, springs on said guide rods continuously tending to force the carriage away from the clamp, a latch device for holding the carriage in positions of adjustment on the guide arms, supporting rollers carried by the carriage, and guide rollers carried by the carriage, the guide rollers adapted to enter the seam, and means for feeding the calking material to the knife.

5. A calking tool comprising a clamp adapted to be secured to a pneumatic hammer, guide arms depending from said clamp, a knife reciprocably mounted in said guide arms, a connecting rod for connecting said knife with the pneumatic hammer, a carriage adjustable on the guide arms, spring guide rods connecting the carriage with the clamp, springs on said guide rods continuously tending to force the carriage away from the clamp, a latch device for holding the carriage in positions of adjustment on the guide arms, supporting rollers carried by the carriage, and guide rollers carried by the carriage, the guide rollers adapted to enter the seam, means for feeding the calking material to the knife, said feeding means comprising a material guide on the carriage, and a tucking lip and yieldable means for pressing said tucking lip against the knife.

6. A calking machine comprising a support including guide arms, a carriage slidable on said guiding arms, springs for projecting said carriage in one direction, means for limiting the movement of said carriage, a latch device for holding the carriage in different positions of adjustment on the arms, a reciprocating tucking knife mounted in guides formed in said arms, means for reciprocating said tucking knife, a guide roller carried by said carriage in advance of the tucking knife, supporting rollers carried by said carriage to the rear of the tucking knife, substantially as shown and described.

7. A calking machine comprising a support including guide arms, a carriage slidable on said guiding arms, springs for projecting said carriage in one direction, means for limiting the movement of said carriage, a latch device for holding the carriage in different positions of adjustment on the arms, a reciprocating tucking knife mounted in guides formed in said arms, means for reciprocating said tucking knife, a guide roller carried by said carriage in advance of the tucking knife, supporting rollers carried by said carriage to the rear of the tucking knife, a material guide carried by said carriage, and a tucking lip mounted on the carriage for holding the material against the tucking knife.

8. A calking machine comprising a support including guide arms, a carriage slidable on said guiding arms, springs for projecting the carriage in one direction, means for limiting the movement of said carriage, a latch device for holding the carriage in different positions of adjustment on the arms, a reciprocating tucking knife mounted in guides formed in said arms, means for reciprocating said tucking knife, a guide roller carried by said carriage in advance of the tucking knife, supporting rollers carried by said carriage to the rear of the tucking knife, a material guide carried by said carriage, and a tucking lip mounted on the carriage for holding the material against the tucking knife, and means for applying yielding pressure to said tucking lip.

In testimony that I claim the foregoing as my own I hereunto attach my signature in the presence of two witnesses.

NELSON GAY.

Witnesses:
 L. S. NAGLE,
 JAS. F. LARKIN.